United States Patent
Kates

(10) Patent No.: US 7,356,473 B2
(45) Date of Patent: Apr. 8, 2008

(54) MANAGEMENT AND ASSISTANCE SYSTEM FOR THE DEAF

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 197 days.

(21) Appl. No.: 11/041,166

(22) Filed: Jan. 21, 2005

(65) Prior Publication Data

US 2006/0167687 A1     Jul. 27, 2006

(51) Int. Cl.
*G10L 11/00* (2006.01)
*G10L 21/00* (2006.01)
*G10L 21/06* (2006.01)

(52) U.S. Cl. .................. 704/271; 704/270; 704/274

(58) Field of Classification Search ............... 340/904; 704/270, 271, 274
See application file for complete search history.

(56) References Cited

U.S. PATENT DOCUMENTS

| | | | | |
|---|---|---|---|---|
| 4,212,085 A | * | 7/1980 | Vaillancour et al. | 367/124 |
| 4,841,773 A | * | 6/1989 | Stewart | 73/510 |
| 5,173,881 A | * | 12/1992 | Sindle | 367/101 |
| 5,422,816 A | * | 6/1995 | Sprague et al. | 455/556.2 |
| 5,495,242 A | * | 2/1996 | Kick et al. | 340/902 |
| 5,508,699 A | | 4/1996 | Silverman | |
| 5,802,460 A | * | 9/1998 | Parvulescu et al. | 455/92 |
| 5,844,824 A | * | 12/1998 | Newman et al. | 345/156 |
| 5,995,936 A | * | 11/1999 | Brais et al. | 704/275 |
| 6,232,918 B1 | * | 5/2001 | Wax et al. | 342/360 |
| 6,243,075 B1 | * | 6/2001 | Fishkin et al. | 345/156 |
| 6,404,351 B1 | * | 6/2002 | Beinke | 340/902 |
| 6,466,232 B1 | * | 10/2002 | Newell et al. | 715/700 |
| 2003/0050040 A1 | * | 3/2003 | Yamazaki et al. | 455/404 |
| 2003/0083024 A1 | * | 5/2003 | Richenstein et al. | 455/99 |
| 2003/0179133 A1 | | 9/2003 | Pepin et al. | |
| 2003/0233455 A1 | | 12/2003 | Rashdan | |
| 2004/0145496 A1 | | 7/2004 | Ellis | |

FOREIGN PATENT DOCUMENTS

| WO | WO 93-26084 A1 | 12/1998 |
|---|---|---|
| WO | WO 00-00938 A1 | 6/2000 |

\* cited by examiner

*Primary Examiner*—David Hudspeth
*Assistant Examiner*—Justin W. Rider
(74) *Attorney, Agent, or Firm*—Knobbe, Martens, Olson & Bear, LLP

(57) ABSTRACT

A computer-aided communication and assistance system that uses a signal processing and other algorithms in a processor in wireless communication with a microphone system to aid a deaf person. An instrumented communication module receives information from one or more microphones and provides textual and, optionally, stimulatory information to the deaf person. In one embodiment, a microphone is provided in a piece of jewelry or clothing. In one embodiment, a wireless (or wired) earpiece is provided to provide microphones and vibration stimulators.

29 Claims, 10 Drawing Sheets

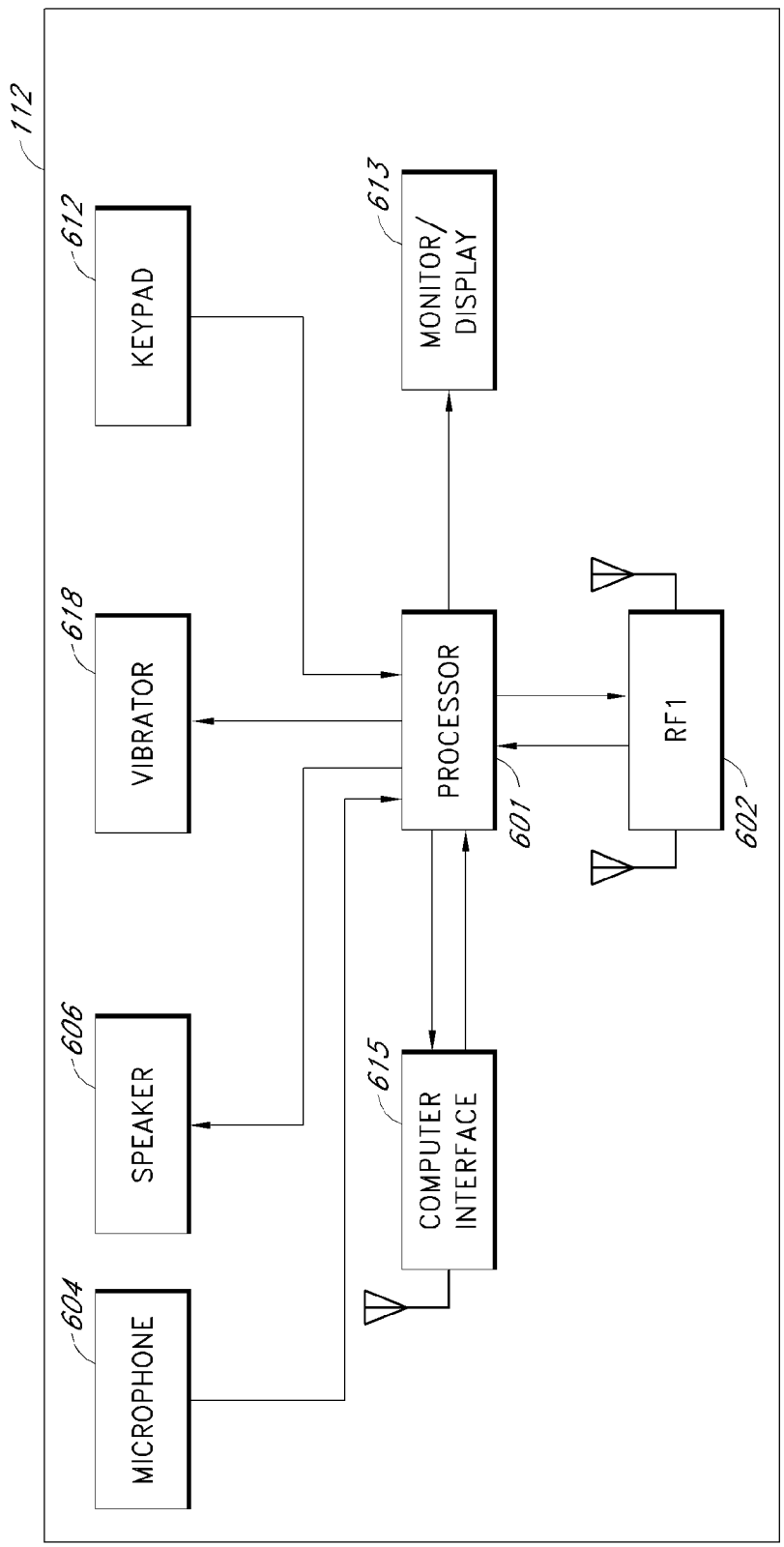

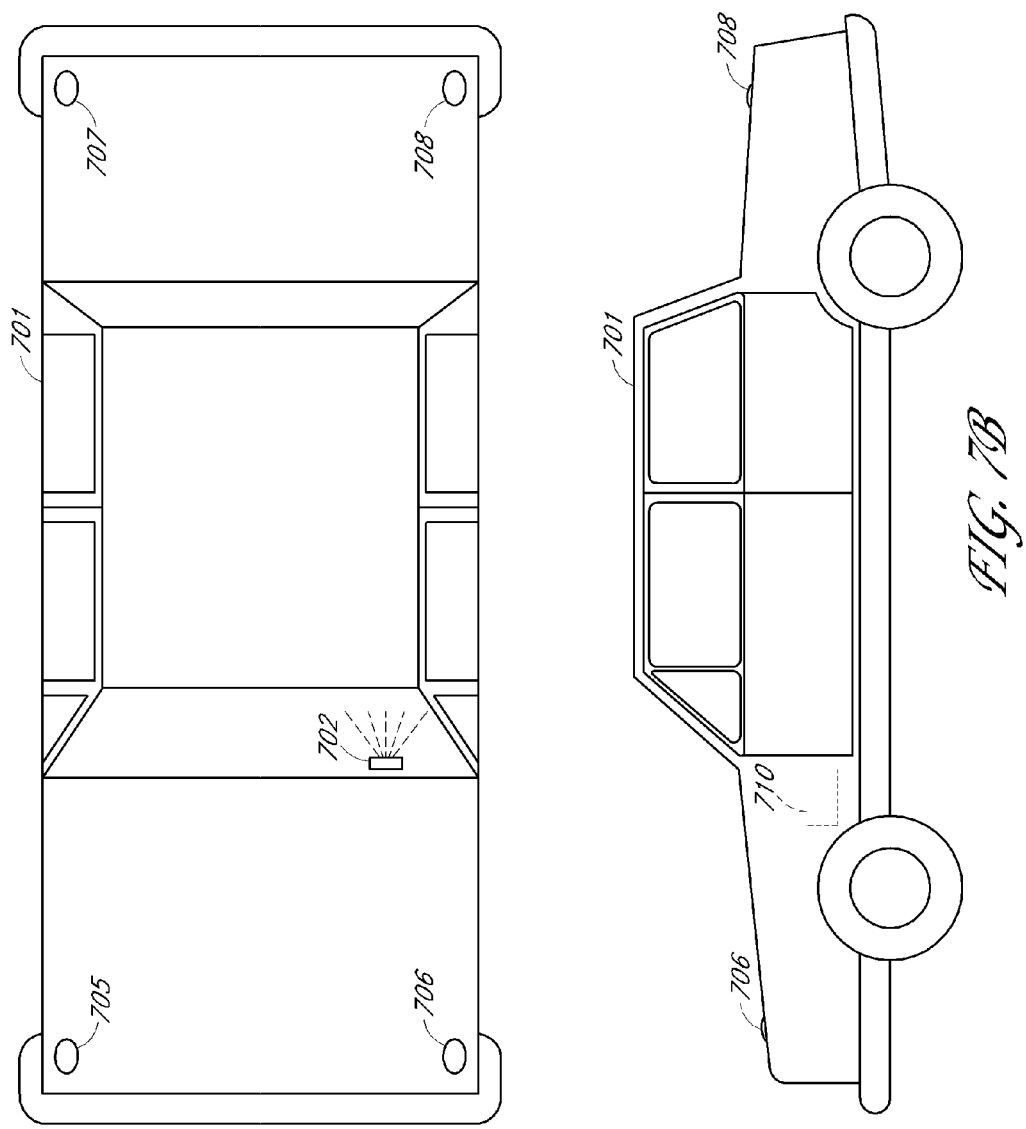

MANAGEMENT AND ASSISTANCE SYSTEM FOR THE DEAF

BACKGROUND OF THE INVENTION

1. Field of the Invention

The present invention relates to a system for computer-aided assistance and life management system for deaf people.

2. Description of the Related Art

People without the sense of hearing live a difficult and dangerous existence. They do not hear warning sounds like sirens. They do not hear information sounds like a doorbell or the beep of a microwave oven. Worst of all, they do not hear the speech of other people. This makes communication with other people very difficult and frustrating.

SUMMARY

These and other problems are solved by a computer-aided communication and assistance system that uses a computer or other processor in wireless communication with a microphone system to aid the deaf person. An instrumented communication module receives information from one or more microphones and provides textual and, optionally, stimulatory information to the deaf person. In one embodiment, a microphone is provided in a piece of jewelry or clothing. In one embodiment, a wireless (or wired) earpiece is provided to provide microphones and vibration stimulators.

In one embodiment, the communication and assistance system communicates with microphones located in and about a house. In one embodiment, the communication and assistance system communicates with microphones located at doorways. In one embodiment, the communication and assistance system relays information from the microphones to a computer monitoring system. In one embodiment, the assistance system provides voice-recognition (e.g., recognition of the person speaking) processing. In one embodiment, the assistance system provides language translation processing. In one embodiment, the assistance system provides speech-recognition processing.

In one embodiment, the communication and assistance system includes a computer system provided to a first wireless communication transceiver and a communication module provided to a second wireless communication transceiver. The communication module has an identification code and is configured to communicate with the computer system using two-way handshaking communication such that the computer system can send instructions to the communication module and receive acknowledgement of the instructions from the communication module. The communication module can send data to the computer system and receive acknowledgement from the computer system according to the identification code. The computer system is configured to send instructions to the communication module and to receive data from the communication module related to one or more actions of the user wearing or carrying the communication module. In one embodiment, the computer system is configured to keep records of at least a portion of the user's actions so that the system can learn to function in a more precise fashion (e.g., the system remembers voices and when the user identifies a person to the system, the system can then correlate the person's voice with the person's name).

In one embodiment, the communication module includes at least one of, an acoustic input device, a vibrator device, an infrared receiver, an infrared transmitter, a microphone, a display device, etc.

In one embodiment, the communication module includes an acoustic input device. In one embodiment, the communication module includes an acoustic output device. In one embodiment, the communication module includes a vibrator device. In one embodiment, the communication module includes a keypad input device. In one embodiment, the communication module includes an infrared receiver. In one embodiment, the communication module includes an infrared transmitter.

In one embodiment, the system includes one or more repeaters.

In one embodiment, the communication device includes a cellular telephone. In one embodiment, the communication device includes a GPS receiver. In one embodiment, the communication device configured to obtain voice or other sound information from one or more location microphones when the microphone reader is within range to read information from the one or more location microphones, and the communication device configured to obtain location from the GPS receiver when location information is available from the GPS receiver.

In one embodiment, the system can be augmented by acoustic sensors provided to the vehicle (e.g., external to the vehicle or attached to the windows of the vehicle) and/or a cockpit display in the vehicle. In one embodiment, the cockpit display includes a warning light. In one embodiment, the cockpit display includes a flashing light. In one embodiment, the cockpit display includes a text display that provides text or picture information to the driver. In one embodiment, the cockpit display indicates the type of sound (e.g., siren, screeching brakes, horn, impact or crash sounds, backup beeper sounds, sirens, warning shouts, etc.). In one embodiment, the cockpit display indicates the direction of the sound. In one embodiment, the cockpit display indicates the direction of the sound source. In one embodiment, the cockpit display indicates the estimated distance to the sound. In one embodiment, the cockpit display indicates the volume of the sound. In one embodiment, the cockpit display indicates the duration the sound.

BRIEF DESCRIPTION OF THE DRAWINGS

FIG. 6B is a block diagram of the handheld device shown in FIG. 6A.

FIG. 7B shows a vehicle sensor and warning system using four quadrant sensors and a cockpit display for helping deaf drivers.

DETAILED DESCRIPTION

Figure 1:
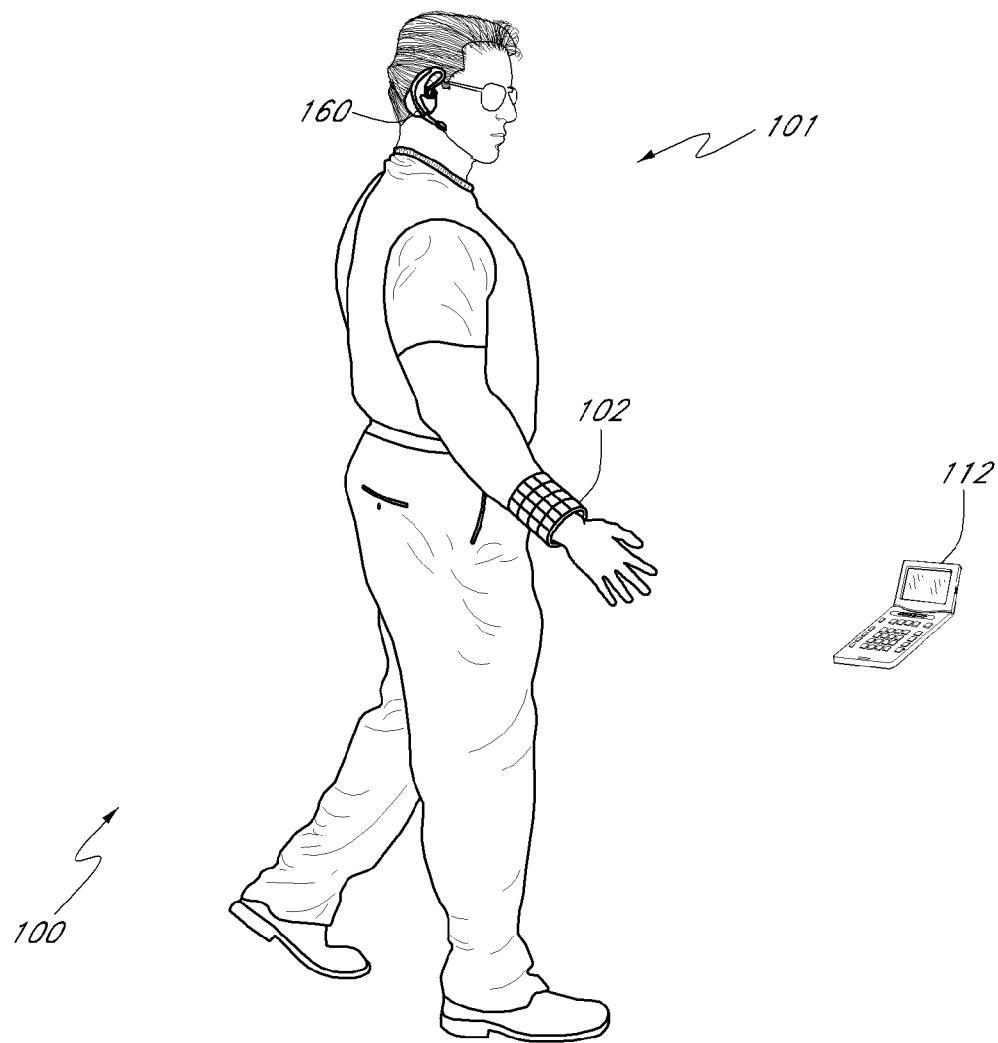
FIG. 1 shows a user wearing and carrying elements of a management and assistance system for the deaf.

FIG. 1 shows a user 101 wearing elements of a management and assistance system for the deaf. In FIG. 1, the user 101 is shown wearing a communication module 102 and a headset 160. A handheld module 112 can be used by the user 101 or handed to a third party to aid in communication with the user 101. In one embodiment, the handheld module 112 is used in lieu of the communication module 102 and provides the functions of the communication module 102. In one embodiment, the handheld module is complementary to the communication module 102 and used in connection with the communication module 102. In order to simplify the explanation, the disclosure that follows refers to the communication module 102, with the understanding that the communication module 102 can be built as a wearable device as shown in FIG. 1 or as a device that can be carried (e.g., handheld, carried in a pocket, etc.)

In one embodiment, the handheld module 112 can be used by a deaf or hearing-impaired parent to monitor a child or children. The handheld module 112 receives sounds from the child or the vicinity of the child and provides information to the communication module 102. The handheld module 112 can be placed in an area near the child or children. Although referred to herein as a handheld device, in one embodiment, the handheld module 112 can be configured to be worn by a child as a wearable device. In one embodiment, the handheld module 112 is configured to identify sounds corresponding to a child in trouble (e.g., crying, yelling, breaking glass, etc.) and warn the parent. In one embodiment, the module 112 includes a location sensor and is configured to identify a location of the child and warn the parent when the child has moved. In one embodiment, the module 112 is configured to warn the parent when the child has moved into a dangerous area (e.g., a forbidden room, a pool area, near a hot stove, etc.). In one embodiment, the module 112 can be queried by the communication module 102 so that the parent can "listen" in on the child by reading speech to text provided by the communication module 102.

One of ordinary skill in the art will recognize that although the preceding paragraph referred to monitoring a child, the handheld module 112 can also be used by a deaf or hearing-impaired person to monitor a being needing care and attention such as, for example, a spouse, a pet, an elderly parent, a disabled person, etc.

One or more microphones in the headset 160 provide acoustic information to the communication module 102. The communication module 102 uses the information from the microphones to ascertain the character of acoustic sounds in the environment, sounds made by the user 101, and optionally, the direction of various sounds. In one embodiment, the communication module 102 uses the headset 160 to provide vibrator and/or optical alerts to the user 101. The user 101 can use a microphone in the headset 160 to send voice commands to the communication module 102 or 112. The user 101 can also use buttons on a keypad on the communication module 102 or 112 to control the operation of the system and input commands into the system.

Figure 2:
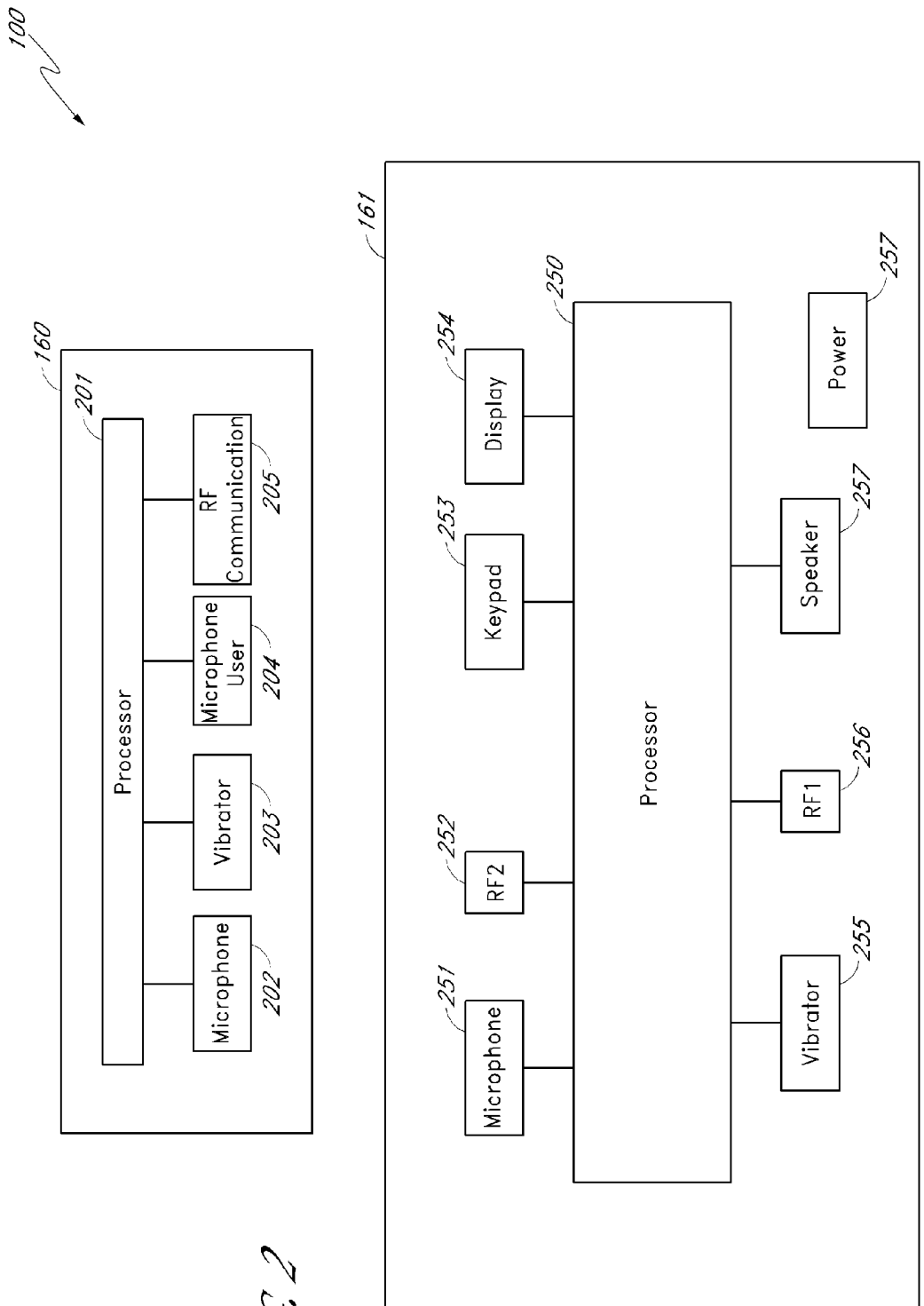
FIG. 2 is a block diagram of various elements of the management and assistance system for the deaf.

FIG. 2 shows block diagrams of the headset 160 and a communication module 161. The communication module 161 is representative of the modules 102 and 112 shown in FIG. 1. In the headset 160, a first microphone 202, a vibrator 203, a second microphone 204, and a communication system 205 are provided to a processor 201. The communication system 205 can use Radio Frequency (RF) communication, optical (e.g., InfraRed communication), direct connection, etc. In one embodiment, the first microphone 202 is configured to pick up sounds in the environment (e.g., speech of others, sirens, horns, doorbells, etc.). In one embodiment, the second microphone 204 is configured to pick up the speech of the user 101. In one embodiment, the first and second microphones 202, 204 are configured to provide direction information so that the direction of a sound source can be ascertained.

In the communication module 161, a microphone 251, a first communication system 256, a keypad 253, a display 254, a vibrator 255, and a second communication system 252 are provided to a processor 250.

In one embodiment, the processor 250 provides processing of the sounds received by the microphones 202, 204, and/or 251. In one embodiment, the acoustic signal processing algorithms are used to distinguish danger sounds (e.g., sirens) from other sounds (e.g., the wind). In one embodiment, the acoustic signal processing algorithms are used to distinguish danger sounds (e.g., sirens) from indicator sounds (e.g., a doorbell). In one embodiment, the acoustic signal processing algorithms are used in speech recognition to convert the received sounds into text on the display 254. In one embodiment, a loudspeaker 257 is provided to the module 161. In one embodiment, the user 101 can enter text using the keypad 253 and instruct the processor 250 to convert the text to speech.

Figure 3:
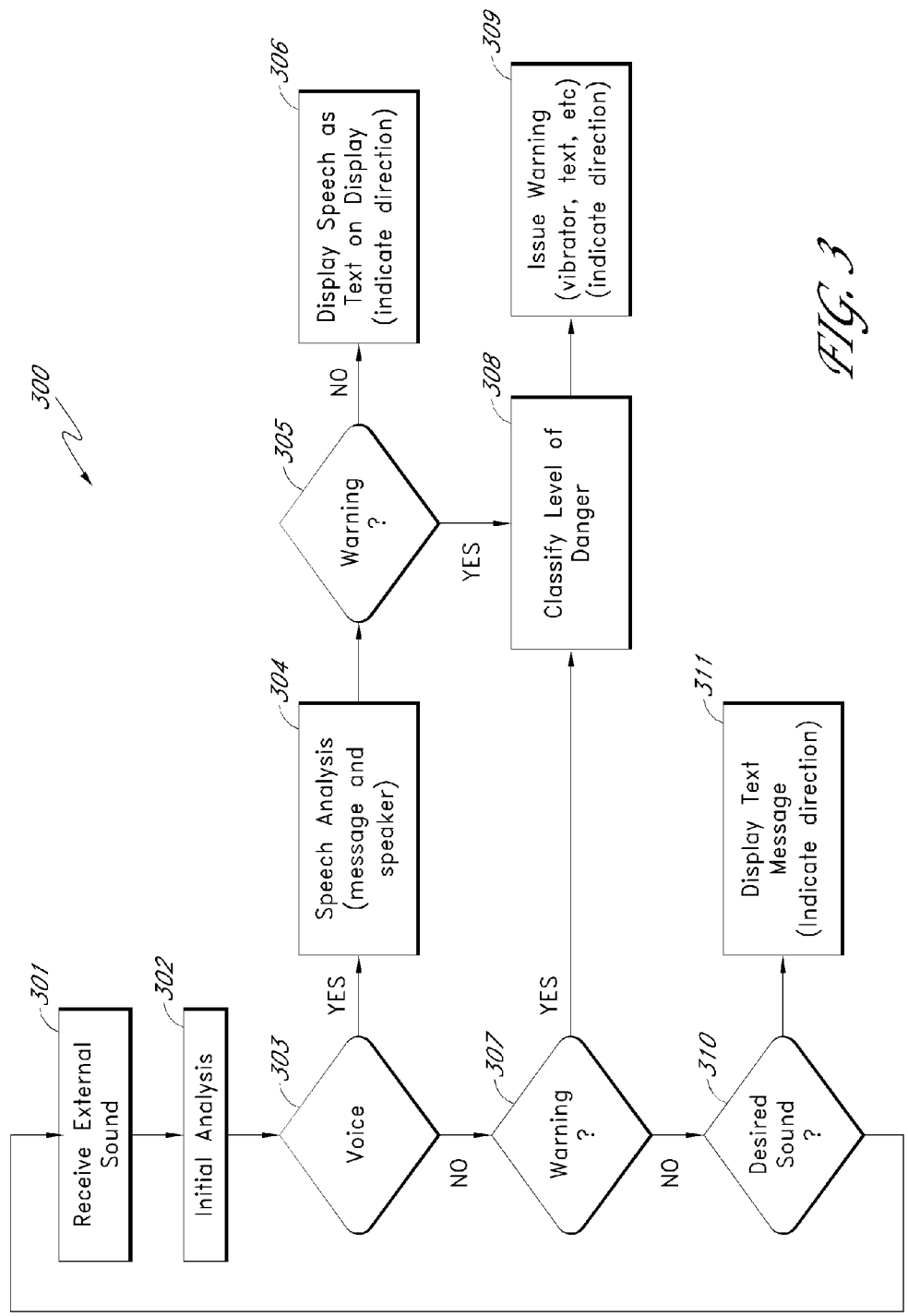
FIG. 3 is a flowchart showing sound processing for external sounds.

FIG. 3 is a flowchart showing one embodiment of processing of sounds from the environment (e.g., sounds not produced by the user 101). In a block 301, the system receives an external sound. In a block 302, an initial analysis of the sound is performed. The initial analysis is passed to a decision block 303. The decision block 303 determines if the external sound corresponds to voice sounds (e.g., talking, yelling, etc). If the sound is a voice sound, then control is passed to a speech analysis block 304; otherwise, control passes to a decision block 307. The speech analysis block 304 converts the sounds into text. Where the speaker's voice is recognized, the block 304 also identifies the speaker. If language translation has been requested, the block 304 also translates the text into a desired language.

The results from the block 304 are provided to a decision block 305. The decision block 305 determines if the speech corresponds to a warning (e.g., "watch out," "stop", etc.). If the sound is a warning sound, then control is passed to a classification block 308; otherwise, control passes to a display block 306. The display block 306 displays the text of the speech on the display 254. In one embodiment, the display block 306 uses the vibrator to alert the user 101 to the presence of text.

The decision block 307 determines if the external sound corresponds to warning sounds (e.g., horns, sirens, etc). If the sound is a warning sound, then control is passed to the classification block 308; otherwise, control passes to a decision block 310. The classification block 308 classifies the urgency or potential level of danger indicated by the warning. Data from the classification block 308 is provided to a warning block 309. The warning block 309 uses the vibrators 203, 255, and the display 254 to alert and warn the user 101. In one embodiment, the warning block 309 also uses the display to give the user an indication of the direction of the warning sound. In one embodiment, the strength of the vibrations produced by the vibrators 203, 255 correspond to the relatively level of perceived danger.

The decision block 310 determines if the external sound corresponds to desired sounds (e.g., a doorbell, a beeper on a microwave oven, a ringing telephone, etc.). If the sound is a desired sound, then control is passed to a message block 311; otherwise, the sound is ignored and control returns to the block 301. The message block 311 classifies the type of sound and issues an appropriate message (e.g., "doorbell ringing, etc.).

Figure 4:
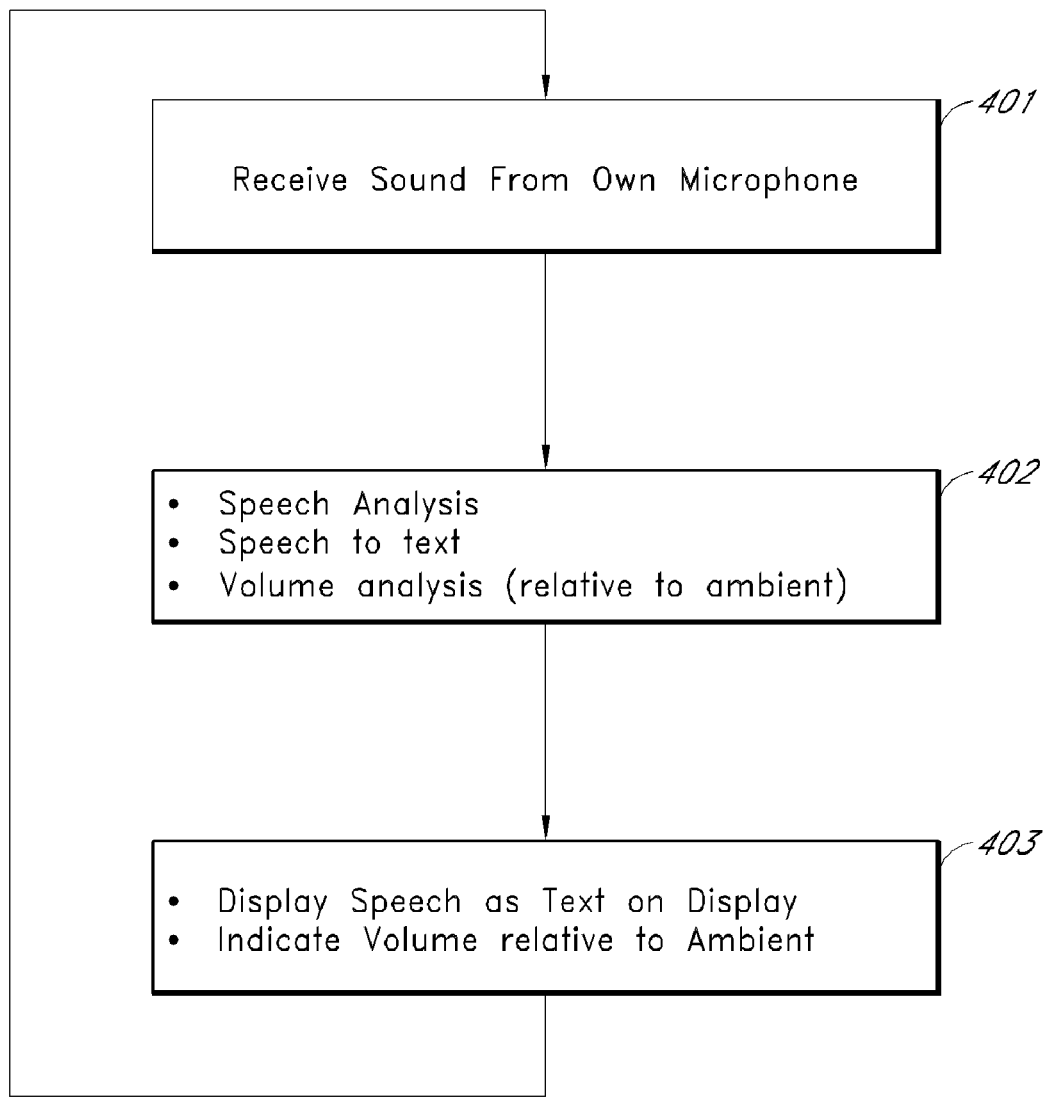
FIG. 4 is a flowchart showing sound processing for speech generated by the user.

FIG. 4 is a block diagram showing the processing for speech or sounds made by the user 101. In a block 401, user speech sounds from the microphone on the headset 160 are received. The sounds are passed to a speech analysis block 402. The block 402 provides speech to text processing. In one embodiment, the block 402 also compares the volume of the speech to the ambient sounds. The results from the block 402 are provided to a display block 403. The display block 403 displays the speech as text so that the user 101 can verify that his/her speech was intelligible and correctly formed. In one embodiment, the display block 403 also indicates the user's speech level as compared to the ambient level so that the user will know if he/she is speaking too loudly or too softly.

In one embodiment, the speech analysis block 402 and the display block 403 provide displays to help the user 101 formulate speech sounds properly. For example, most human languages are composed of a relatively small number of sounds (e.g., the letters of the alphabet and the various ways of saying those letters.) In one embodiment, the user can place the system 160 in a mode where it will display such formants for the user so that the user can practice forming speech sounds in order to improve his/her speech.

In one embodiment, the user 101 can carry an extra communication module 102 and provide the extra module 160 to a third person for conversation. The Third person can speak into the second communication module 102 and see his/her speech converted to text on the display. The text on the third person's display is relayed by the second communication module 102 to a first communication module 112 held or worn by the user 101. In this way, both participants in the conversation can verify that the speech to text operation and text-to-speech operations are translating speech and text as desired.

Figure 5:
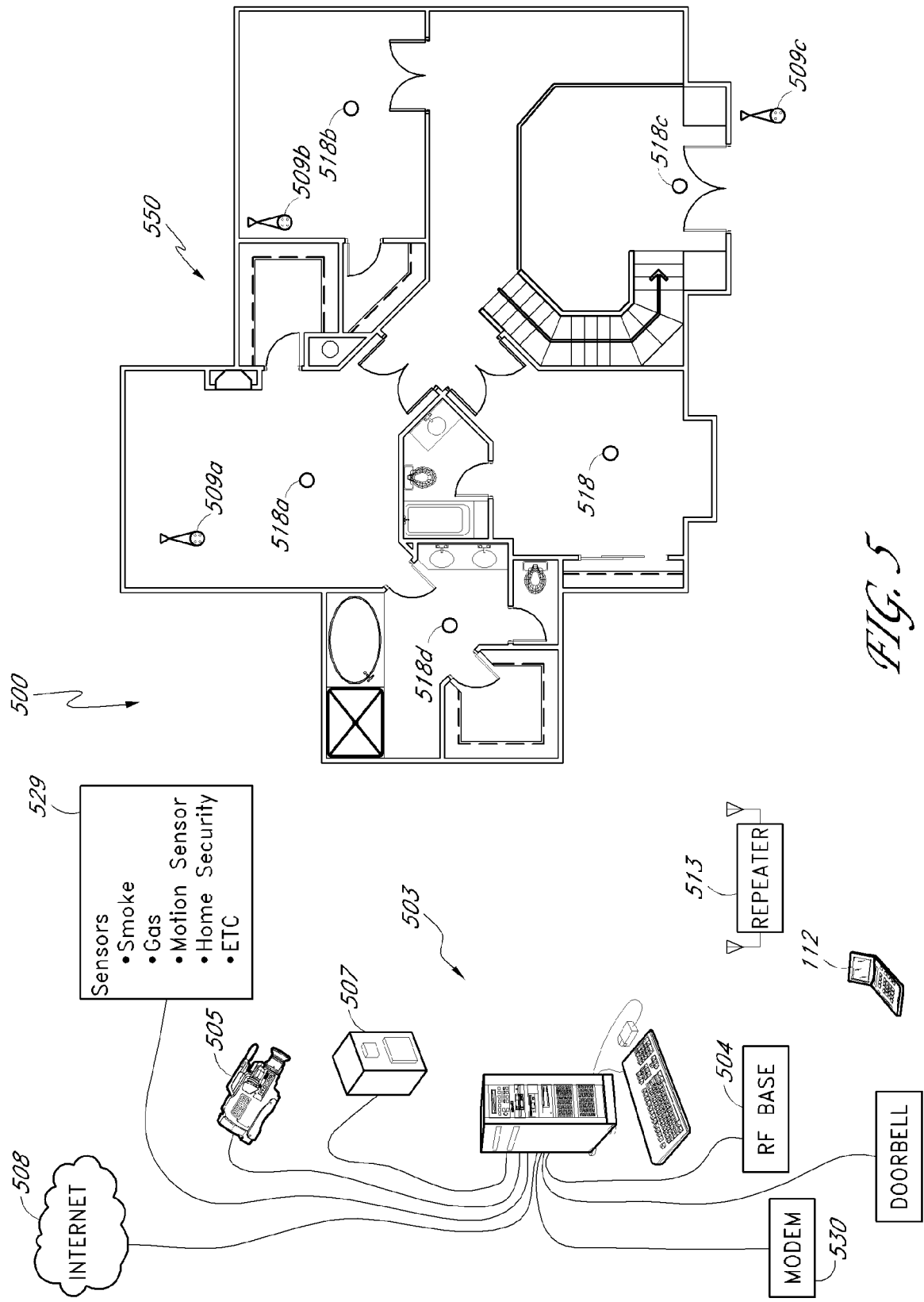
FIG. 5 shows the elements of a management and assistance system for the deaf in connection with a home automation system.

Various elements of a communication and assistance system 100 for helping a deaf person 101 can be integrated into a home or building automation system 500 as shown in FIG. 5. The elements shown in FIG. 5 work together with the elements shown in FIG. 1 to provide additional functionality and capability. For purposes of explanation, and not by way of limitation, the system 500 is described herein as a system to be used by a person who is deaf. One of ordinary skill in the art will recognize that various aspects of the system 500 can also be used for persons that are partially deaf, or otherwise impaired. The system 500 includes a computer system 503 and/or communication module 502 to control the system 500 and, to collect data, and to provide data for the caretaker and/or the user 101. The system typically includes a wireless communication module 112 and a wireless base unit 504. The communication module 112 communicates with the user 101.

The microphones placed about a house or structure 550 provides an identification code to identify location, objects, environment, etc. The communication module 504 reads the microphones and relays the information from the microphones to the computer 503 and/or to the user 101.

The system 500 can also include one or more of the following optional devices: one or more video cameras monitors 505, one or more loudspeakers 507, one or more motion sensors 506, etc. The system 500 can further include one or more of the following optional devices: a remote control/display 112 for allowing the user 101 to interact with the system 503, ambient condition sensors (e.g., smoke, gas, fire, etc.) etc. In one embodiment, the ambient condition sensors are wireless sensors that communicate wirelessly with the computer system 503 and/or communication module 112.

In one embodiment, the system 500 can be used as a computerized system for informing the user 101 of sounds or events around the house. Textual instructions or information can be provided through the 160.

In one embodiment, a modem 530 is provided for making connections with the telephone system, to allow the system 500 to communicate with a caretaker and/or the user 101 through cellular telephone, text messaging, pager, etc. A network connection 508 (e.g., an Internet connection, local area network connection, wide area network connection, etc.) is provided to allow the caretaker and/or the user 101 to communicate with the system 500 and to allow the system 500 to receive updated software, updated status information, etc. Thus, for example, in one embodiment, the user 101 can contact the system 503 to obtain map information, call for assistance, etc.

In one embodiment, the system 500 provides indications (e.g., green light, text messages, etc.) when the user 101 is in a safe environment and/or warning indications (e.g., red lights, warning messages, vibration, etc.) when the user is in an unsafe environment (e.g., unknown person at the front door, motion sensor activated, smoke alarm activated, home security system activated, outside motion sensor activated, etc.). In one embodiment, the user 101 can select the conditions that trigger sounds versus vibrations. Thus, for example, an experienced user may choose to use vibration from the communicate module 112 for certain types of sounds and text messages for other types of sounds.

In one embodiment, the system 500 uses the sensors 529 to detect fire or smoke. In one embodiment, the system 500 receives alarm data from a home alarm system. In one embodiment, a wireless microphone 509 is used to detect a fire alarm. When the system 500 detects a fire or smoke alarm, the system 500 can instruct the user to leave and notify the a family member or caretaker. The caretaker can be notified by using the loudspeakers 507, by telephone, pager, and/or text messaging using the modem 530 to connect with the telephone system, and/or by using the network connection 508 (e.g., email instant messaging, etc.). The modem 530 is configured to place a telephone call and then communicate with the user using data (e.g., in the case of text messaging) and/or synthesized voice. The modem 530 can also be used by the caretaker and/or the user 101 to contact the computer system 503 and/or control the system 500 using voice recognition instructions and/or data or keyboard inputs from the cellular telephone. In one embodiment, the communication device 160 is configured with a cellular telephone interface so that the user 101 can communicate with the system 503 via the display and keyboard on the communication device 160.

The user's response to instructions is monitored by the system 500 by using data from the communication module 102, and/or by video processing from one or more video cameras 506. Thus, for example, if the user 101 does not respond to a fire or smoke alarm (e.g., because the user is not wearing a vibrator and is asleep and does not see a flashing light), then the system 500 can notify a neighbor, family member, or other caretaker. In addition, the user's response to instructions can be determined by the caretaker and/or the user 101 in real time. In one embodiment, a caretaker or instructor works with the user 501 and the system 500 to get the user accustomed to the system.

The communication module 102 is configured to be carried and/or to be worn on the wrist, belt, chest, etc. In the communication module 102, includes one or more sound sensing devices (e.g., a microphones), a vibration device, and a communication device (e.g., a first RF transceiver). The sound sensing device is configured to sense sound waves (sonic and/or ultrasonic) such as, for example, a microphone, a transducer, etc. For convenience, and without limitation, the sound sensing device is referred to herein as a microphone with the understanding that other acoustic transducers can be used as well. For convenience, and without limitation, the sound producing device is referred to herein as a loudspeaker with the understanding that the sound producing device is configured to produce sound waves (sonic and/or ultrasonic) such as, for example, a loudspeaker, a transducer, a buzzer, etc. The communication module 102 can also include one or more lights (not shown) for providing visual indications to the user.

The microphones are used to pick up sound waves such as, for example, sounds produced by the user 101, sounds produced by other people, and/or acoustic waves produced by an acoustic location device (sonic or ultrasonic), etc. In one embodiment, the microphone 202 is configured to pick up external sounds (e.g., sounds not made by the user) and the microphone 204 is configured to pick up sounds made by the users. In one embodiment, the system 100 includes voice-recognition processing to help the user 101 know who is in the room, at door, etc., and what the person is saying. The processor 201 processes the sounds picked up by the microphones and, if needed, sends processed data to the computer system 503 and/or communication module 102 for further processing.

The vibrator can be used in a manner similar to a vibrator on a cellular telephone to alert the user 101 without disturbing other people in the area. The vibrator can also be used to alert the user 101 to abnormal or potentially dangerous conditions or to the presence of text messages on the communication device 160. Deaf people tend to rely more on their sense of touch than people with good hearing. Thus, in one embodiment, the vibrator can be configured to provided different types of vibrations (e.g., different frequency, different intensity, different patterns, etc.) to send information to the user 101.

The first RF transceiver 205 communicates with the communication unit 160. The communication unit 160 can communicate with the system 500 either directly or through the repeaters. In one embodiment, the RF transceiver 205 provides two-way communications such that the communication module 102 can send information to the computer system 503 and/or communication module 102 and receive instructions from the computer system 503 and/or communication module 102. In one embodiment, the computer system 503 and/or communication module 102 and the first RF transceiver 302 communicate using a handshake protocol, to verify that data is received.

The user 101 can use the system 100 to "listen" to various microphones 509 around the house and thereby obtain information about the user's surroundings. For example, in one embodiment, microphones are provided near windows, doors, in children's play areas, etc. In one embodiment, the communication module 102 includes one or more location and tracking systems, such as, for example, an IR system, a GPS location system, an Inertial Motion Unit (IMU) and/or radio frequency systems. The tracking systems can be used alone or in combination to ascertain the location of the user 101 and to help the user 101 hear sounds in the areas about the structure 550. Thus, for example, a child's cry in a different room can be forwarded by the system 500 to the user 101. Whereas, a child's cry in a room occupied by the user 101 does not need to be relayed because it will be picked up by the headset 160.

In one embodiment, the microphone 204 is used to allow the user to send voice commands to the system 500.

The communication module 102 sends low-battery warnings to the computer system 503 and/or communication module 102 to alert the caretaker and/or the user 101 that the communication module 102 needs fresh batteries.

The Global Positioning System (GPS) is accurate but often does not work well indoors, and sometimes does not have enough vertical accuracy to distinguish between floors of a building. GPS receivers also require a certain amount of signal processing and such processing consumes power. In a limited-power device such as the communication module 102, the power consumed by a GPS system can reduce battery life. However, GPS has the advantages of being able to operate over a large area and is thus, particularly useful when locating a user that has escaped a confined area or is out of the range of other locating systems.

GPS tends to work well outdoors, but poorly inside buildings. Thus, in one embodiment, the system 100 uses GPS in outdoor situations where microphones are unavailable, and microphones indoors where GPS is unavailable or unreliable. Thus, using the system 100, the position of the user 101 in a building can be ascertained.

In one embodiment, the GPS system 302 operates in a standby mode and activates at regular intervals or when instructed to activate. The GPS system can be instructed by the computer 503 and/or to the user 101 or the communication module to activate. When activated, the GPS system obtains a position fix on the user 101 (if GPS satellite signals are available) and updates the IMU. In one embodiment, a GPS system is also provided to the computer system 503 and/or communication module 102. The computer system uses data from its GPS system to send location and/or timing data to the GPS system in the communication module 102 allowing the GPS system 302 to warm start faster, obtain a fix more quickly, and therefore, use less power.

In one embodiment, location system units are placed about the house or building 550 to locate movement and location of the user 101. In one embodiment, location system units send infrared light, acoustic waves, and/or electromagnetic waves to one or more sensors on the communication module 102 in order to conserve power in the communication module 102. In one embodiment, the communication module 102 sends infrared light, acoustic waves, and/or electromagnetic waves to the location system units in order to conserve power in the units. In one embodiment, the communication module 102 sends inaudible sounds (e.g., ultrasonic sounds) to the wireless microphones 509 to locate the user 101.

For example, location system units placed near doorways or in hallways can be used to determine when the user 101 moves from one room to another. Even if the user cannot be exactly located within the room (e.g., due to blind spots), a location system unit placed to sense the movement of the user though the doorway allows the system 500 to know which room the user is in by watching the user 101 move from room to room.

In one embodiment, each location transmitter (whether in the communication module 102 or the location system units) sends a coded pattern of pulses to allow the transmitter to be identified. In one embodiment, in order to conserve power, the location receiver (whether in the communication module 102 or the location system units 118) notifies the computer system 503 and/or communication module 102 whenever the pattern of received pulses changes. Thus, for example, when the location receiver enters the range of a first location transmitter that transmits a first code, the location receiver sends a "location sensor message" to the computer system 503 and/or communication module 102. In one embodiment, the location receiver does not send further location sensor messages so long as the location receiver continues to receive the pattern of pulses from the same location transmitter. In an alternate embodiment, the location receiver sends location sensor messages to the computer system 103 and/or communication module 102 on a periodic basis so long as the location receiver continues to receive the pattern of pulses from the same transmitter. The location receiver sends a "location sensor lost" message when the pattern of pulses stops.

Motion detectors inside and/or outside a house are commonly provided in connection with home security systems. In one embodiment, the location system units 118 are configured as motion detectors, and the IR system (e.g., transmitter and/or receiver) on the communication module 102 communicates with such IR motion detectors to avoid false alarms that would otherwise occur when the motion detector detects the movement of the user. In one embodiment, the communication module transmits an IR signal that the motion detector recognizes as coming from the communication module 102 and thus, the motion detector knows that the motion it is sensing is due to the user and not an intruder. In one embodiment, when the communication module 102 detects an IR transmission from a motion detector, the communication module transmits a response IR signal that the motion detector recognizes. In one embodiment, the IR tracking system used by the system 500 is also used as part of a home security system to track both the movement of the user and other movements in the house that are not due to the user. Acoustic motion detectors and/or microwave motion detectors can be used with the communication module 102 similarly to the IR motion detectors.

In one embodiment, the sonic or ultrasonic location system includes a ranging function similar to that of an RF system. In one embodiment, the ranging function uses a two-frequency phase comparison system to measure distance from the sound transmitter to the sound receiver.

In one embodiment, the IR system can be used to send IR signals to the video cameras 506.

In one embodiment, the system 500 locates the user periodically (e.g., communicates with the communication module 102) and alerts the caretaker and/or the user 101 if the user cannot be found (e.g., if the system 100 cannot contact the communication module 102).

In one embodiment, the system 500 can be used to communicate with the user. The system 500 receives feedback regarding the user's speech patterns, actions, and can thus, learn various aspects of the user's behavior and vocabulary. In one embodiment, the system 500 is configured to adapt to the user's speech to warn the user when his/her speech is becoming unintelligible, too loud, too soft, etc. In one embodiment, the system 100 warns the user when the user is mispronouncing certain speech sounds. The user "speech recognition" system can base its discrimination on acoustic features, such as, for example, formant structure, pitch, loudness, spectral analysis, etc. When the computer recognizes the message behind the sounds made by the user, then the system 130 can respond accordingly.

In one embodiment, the system 500 responds to voice commands, thus, for example, the user 101 can query the system 100 as to the outside temperature, set the home thermostat, turn lights on and off, etc. In one embodiment, the system 503 is provided with communications access (e.g., Internet access, cellular telephone access, pager access, etc.) to contact the caretaker. In an alternate example, if the user makes a sound indicating that help is needed, then the system 503 can contact a caretaker or emergency service.

In one embodiment, the system 500 recognizes the speech of user 101 and family members, friends, etc. thus, if a stranger or unknown person enters the area and makes sounds, the system 500 can recognize that a stranger or unknown person is in the area and take appropriate action (e.g., notify the caretaker, emergency service, security service, etc.)

Figure 6A:
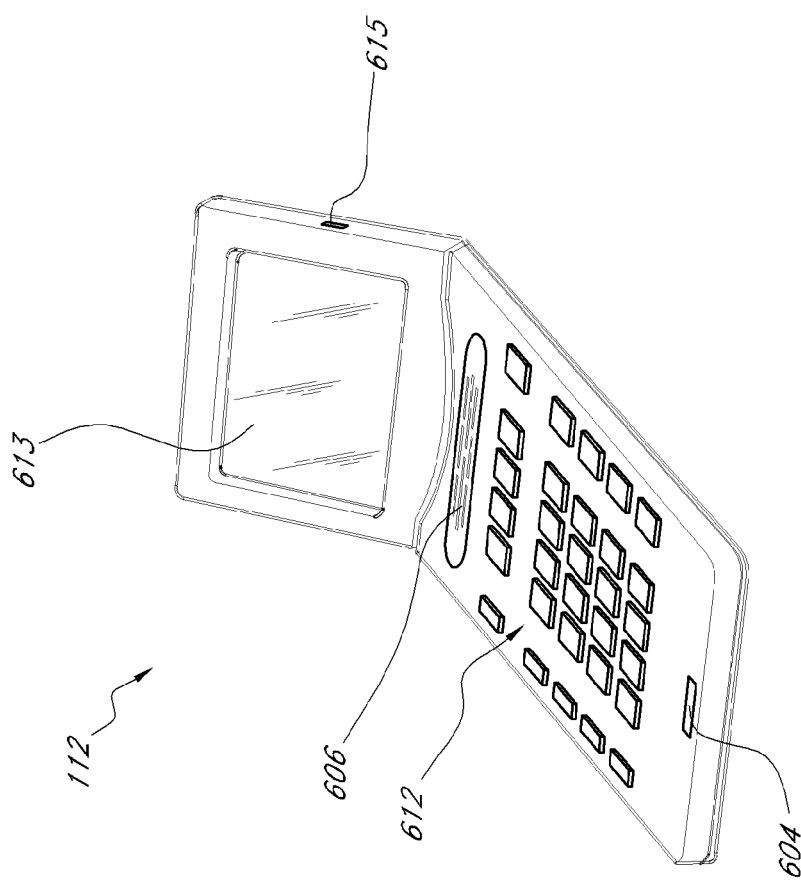
FIG. 6A is a diagram of a handheld device that can be used by the user or by a third party in connection with the assistance system for the deaf.

FIG. 6 is a block diagram of the handheld control 112 for the system 100 and. The remote control 112 includes a microphone 604, a loudspeaker 606, a keyboard (or keypad) 612, a display 613, and a first RF transceiver 602, all provided to a processor 601.

The remote control 112 communicates with the computer system 503 and/or communication module 102 using the RF transceiver 602 to receive status information and to send instructions to the system 500. The user 101 can also use the remote control 112 to send instructions to the system 500. For, example, using the microphone 604, the caretaker can speak to the user 101.

In one embodiment, the communication module 102 provides bi-directional communication and is configured to receive data and/or instructions from the base unit 504. Thus, for example, the base unit 504 can instruct the communication module 102 to perform additional measurements, to go to a standby mode, to wake up, to report battery status, to change wake-up interval, to run self-diagnostics and report results, etc. In one embodiment, the communication module 102 reports its general health and status on a regular basis (e.g., results of self-diagnostics, battery health, etc.).

In one embodiment, the communication module 102 samples, digitizes, and stores textual data from the microphone 204 when such data exceeds a volume threshold and/or when other sensors indicate that the textual data should be digitized and stored. For example, when sending voice commands, the user 101 can press a button on the keypad 253 to indicate that a voice command is being given. The user 101 can also use the keypad 253 to enter commands to the communication module 101.

In one embodiment, the communication module 102 provides two wake-up modes, a first wake-up mode for taking sensor measurements (and reporting such measurements if deemed necessary), and a second wake-up mode for listening for instructions from the central computer 103 and/or to the user 101. The two wake-up modes, or combinations thereof, can occur at different intervals.

In one embodiment, the communication module 102 use spread-spectrum techniques to communicate with the repeater unit 513. In one embodiment, the communication module 102 uses Code Division Multiple Access (CDMA) techniques. In one embodiment, the communication module 102 uses frequency-hopping spread-spectrum. In one embodiment, the communication module 102 has an address or identification (ID) code that distinguishes the communication module 102 from the other RF units of the system 100. The communication module 102 attaches its ID to outgoing communication packets so that transmissions from the communication module 102 can be identified by the repeater 113. The repeater 113 attaches the ID of the communication module 102 to data and/or instructions that are transmitted to the communication module 102. In one embodiment, the communication module 102 ignores data and/or instructions that are addressed to other RF units.

In one embodiment, the communication module 102 includes a reset function. In one embodiment, the reset function is activated by a reset switch on the communication module 102. In one embodiment, the reset function is activated when power is applied to the communication module 102. In one embodiment, the reset function is activated when the communication module 102 is connected to the computer system 503 and/or communication module 102 by a wired connection for programming. In one embodiment, the reset function is active for a prescribed interval of time. During the reset interval, the transceiver is in a receiving mode and can receive the identification code from the computer 503 and/or to the user 101. In one embodiment, the computer 503 and/or user 101 wirelessly transmits a desired identification code. In one embodiment, the identification code is programmed by connecting the communication module 102 to the computer through an electrical connector, such as, for example, a USB connection, a firewire connection, etc. In one embodiment, the electrical connection to the communication module 102 is provided by sending modulated control signals (power line carrier signals) through a connector used to connect the power source 303. In one embodiment, the external programmer provides power and control signals.

In one embodiment, the communication module 102 communicates with the repeater 513 on the 900 MHz band. This band provides good transmission through walls and other obstacles normally found in and around a building structure. In one embodiment, the communication module 102 communicates with the repeater 513 on bands above and/or below the 900 MHz band. In one embodiment, the communication module 102, repeater 513, and/or base unit 504 listens to a radio frequency channel before transmitting on that channel or before beginning transmission. If the channel is in use, (e.g., by another device such as another repeater, a cordless telephone, etc.) then the sensor, repeater, and/or base unit changes to a different channel. In one embodiment, the communication module 102, repeater, and/or base unit coordinate frequency hopping by listening to radio frequency channels for interference and using an algorithm to select a next channel for transmission that avoids the interference. Thus, for example, in one embodiment, if the communication module 102 senses a dangerous condition (e.g., a smoke alarm) and goes into a continuous transmission mode, the communication module 102 tests (e.g., listens to) the channel before transmission to avoid channels that are blocked, in use, or jammed. In one embodiment, the communication module 102 continues to transmit data until it receives an acknowledgement from the base unit 504 that the message has been received. In one embodiment, the communication module transmits data having a normal priority (e.g., status information) and does not look for an acknowledgement, and the communication module transmits data having elevated priority until an acknowledgement is received.

The repeater unit 513 is configured to relay communications traffic between the communication module 102 and the base unit 504. The repeater unit 513 typically operates in an environment with several other repeater units. In one embodiment, the repeater 513 has an internal power source (e.g., battery, solar cell, fuel cell, etc.). In one embodiment, the repeater 513 is provided to household electric power. In one embodiment, the repeater unit 513 goes to a low-power mode when it is not transmitting or expecting to transmit. In one embodiment, the repeater 513 uses spread-spectrum techniques to communicate with the base unit 504 and with the communication module 102. In one embodiment, the repeater 113 uses frequency-hopping spread-spectrum to communicate with the base unit 104 and the communication module 102. In one embodiment, the repeater unit 513 has an address or identification (ID) code and the repeater unit 113 attaches its address to outgoing communication packets that originate in the repeater (that is, packets that are not being forwarded).

In one embodiment, the base unit 504 communicates with the communication module 102 by transmitting a communication packet addressed to the communication module 102. The repeaters 513 receive the communication packet addressed to the communication module 102. The repeaters 513 transmit the communication packet addressed to the communication module 102 to the communication module 102. In one embodiment, the communication module unit 102, the repeater units 513, and the base unit 104 communicate using Frequency-Hopping Spread Spectrum (FHSS), also known as channel-hopping.

Frequency-hopping wireless systems offer the advantages of avoiding other interfering signals and avoiding collisions. Moreover, there are regulatory advantages given to systems that do not transmit continuously at one frequency. Channel-hopping transmitters change frequencies after a period of continuous transmission, or when interference is encountered. These systems may have higher transmit power and relaxed limitations on in-band spurs.

In one embodiment, the computer 503 maintains a database of the health, power status (e.g., battery charge), and current operating status of various units in the system 500. In one embodiment, the computer 503 and/or the user 101 automatically performs routine maintenance by sending instructions to each unit to run a self-diagnostic and report the results. The computer 503 and/or the user 101 collects and logs such diagnostic results. In one embodiment, the computer 503 and/or the user 101 sends instructions to tell each unit how long to wait between "wakeup" intervals. In one embodiment, the computer 503 and/or the user 101 schedules different wakeup intervals to different RF units based on the unit's health, power status, location, usage, etc. In one embodiment, the computer 503 and/or the user 101 schedules different wakeup intervals to different communication module units based on the type of data and urgency of the data collected by the unit.

In one embodiment, the computer 503 and/or to the user 101 produces a display that tells the caretaker and/or the user 101 which RF units need repair or maintenance. In one embodiment, the computer 503 and/or to the user 101 maintains a list showing the status and/or location of each user 101 according to the ID of each communication module. In one embodiment, each communication module 102 has a unique identification code.

In one embodiment, the communication module 102 and/or the repeater units 513 measure the signal strength of the wireless signals received (e.g., the communication module 102 measures the signal strength of the signals received from the repeater unit 513, the repeater unit 513 measures the signal strength received from the communication module 102 and/or the base unit 504). The communication module 102 and/or the repeater units 513 report such signal strength measurement back to the computer 503 and/or to the user 101. The computer 503 and/or to the user 101 evaluates the signal strength measurements to ascertain the health and robustness of the RF units of the system 500. In one embodiment, the computer 503 and/or to the user 101 uses the signal strength information to re-route wireless communications traffic in the system 500. Thus, for example, if the repeater unit 513 goes offline or is having difficulty communicating with the communication module unit 160, the computer 503 and/or to the user 101 can send instructions to a different repeater unit.

In one embodiment, the communication module 102 includes radio frequency, acoustic and infrared communications capabilities. In one embodiment, the system 100 communicates with the communication module 102 using radio frequency, acoustic or infrared communication depending on the situation, e.g., acoustic, infrared, or relatively higher frequency radio frequencies for relatively shorter range communication and relatively lower frequency radio frequencies for relatively longer range communications.

Figure 7A:
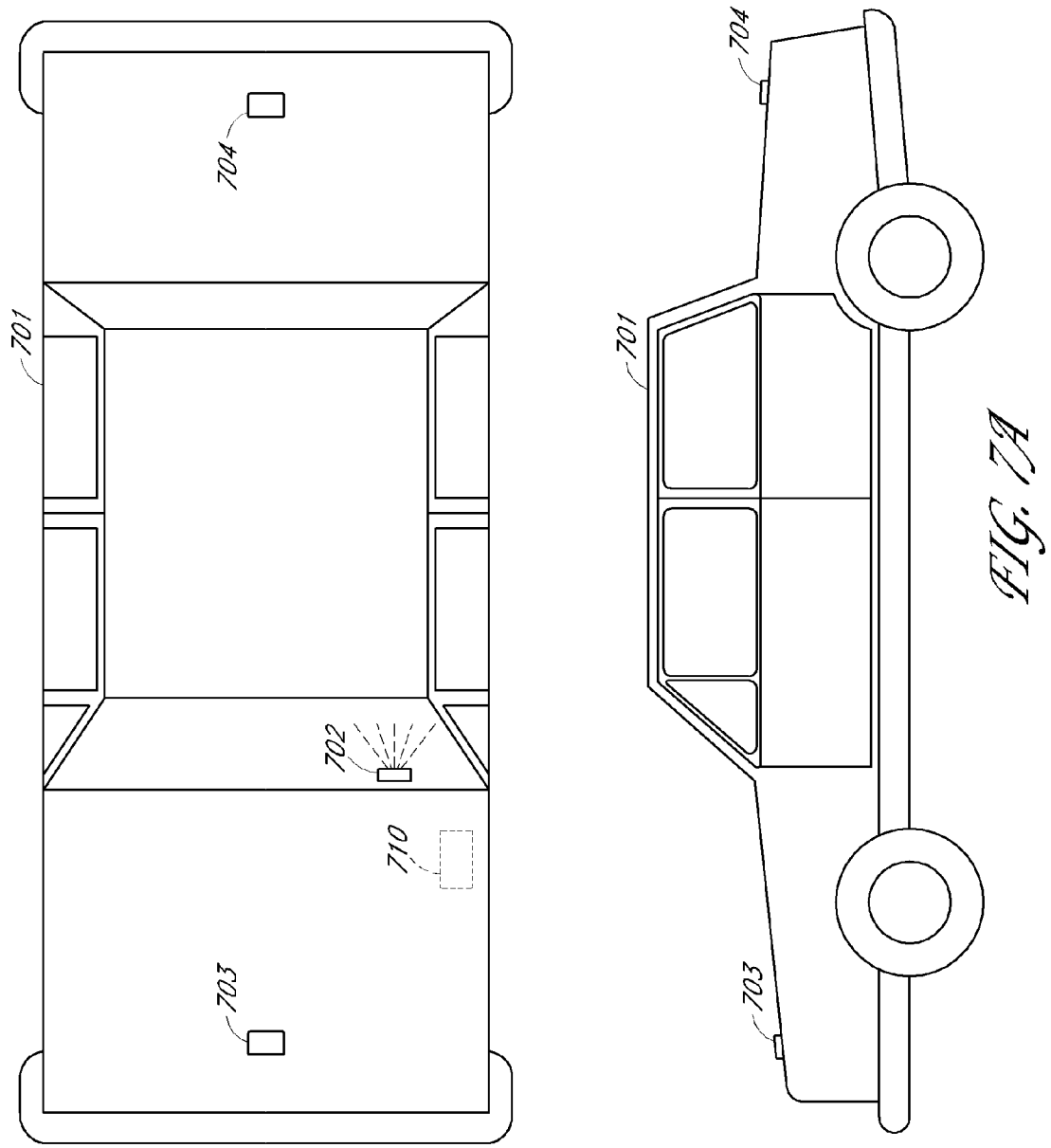
FIG. 7A shows a vehicle sensor and warning system using forward and aft sensors and a cockpit display for helping deaf drivers.

In a vehicle, such as a car, truck, etc., the system described above in connection with FIGS. 1-6 can be augmented by external microphones provided to the exterior of the vehicle. FIG. 7A shows a vehicle sensor and warning system using forward and aft sensors and a cockpit display for helping deaf drivers. In FIG. 7A, a vehicle 701 is provided with a forward acoustic sensor system 703 and an aft acoustic sensor system 704. The acoustics sensor systems 703-704 provide acoustic information to a processing system 710. The processing system provides information to a display 702 that provides warning and information to the driver. In one embodiment, the display 702 includes a warning light. In one embodiment, the display 702 includes a flashing light. In one embodiment, the display 702 includes a text display that provides text or picture information to the driver. In one embodiment, the display 702 indicates the type of sound (e.g., siren, screeching brakes, horn, impact or crash sounds, backup beeper sounds, sirens, warning shouts, etc.). In one embodiment, the display 702 indicates the direction of the sound. In one embodiment, the display 702 indicates the direction of the sound source. In one embodiment, the display 702 indicates the estimated distance to the sound. In one embodiment, the display 702 indicates the volume of the sound. In one embodiment, the display 702 indicates the duration the sound.

FIG. 7B shows an alternative embodiment wherein four quadrant sensors 705-708 are provided to four quadrants of the vehicle.

In one embodiment, the sensors 703-708 are wireless sensors that wirelessly provide information to the processor 710. In one embodiment, the sensors 703-708 are wired sensors that are wired to the processor 710. In one embodiment, the sensors 703-708 are microphones. In one embodiment, one or more of the sensors 703-708 are configured as an array of sensors in order to provide direction-finding information.

In one embodiment, one or more of the sensors 703-708 are configured as a phased array of sensors in order to provide direction-finding information. In one embodiment, the processor 710 uses adaptive signal processing in connection with the phased array sensors to provide improved direction finding, beam steering, and noise reduction processing. In one embodiment, the processor 710 receives information from the sensors 703-704 and the signal processing in used by the processor includes digital beam forming, thereby allowing the processor 710 to calculate multiple beams and nulls from in the pattern of sound received by the sensors 703-704.

FIGS. 7A-7B show the sensors 703-708 mounted on the hood, trunk, or fender areas of the vehicle. One of ordinary skill in the art will recognize that the sensors 703-708 can also be mounted on the roof, sides, front, and/or back of the vehicle. In one embodiment, one or more of the sensors 703-708 are provided to the lighting systems of the vehicle for mounting.

Figure 8:
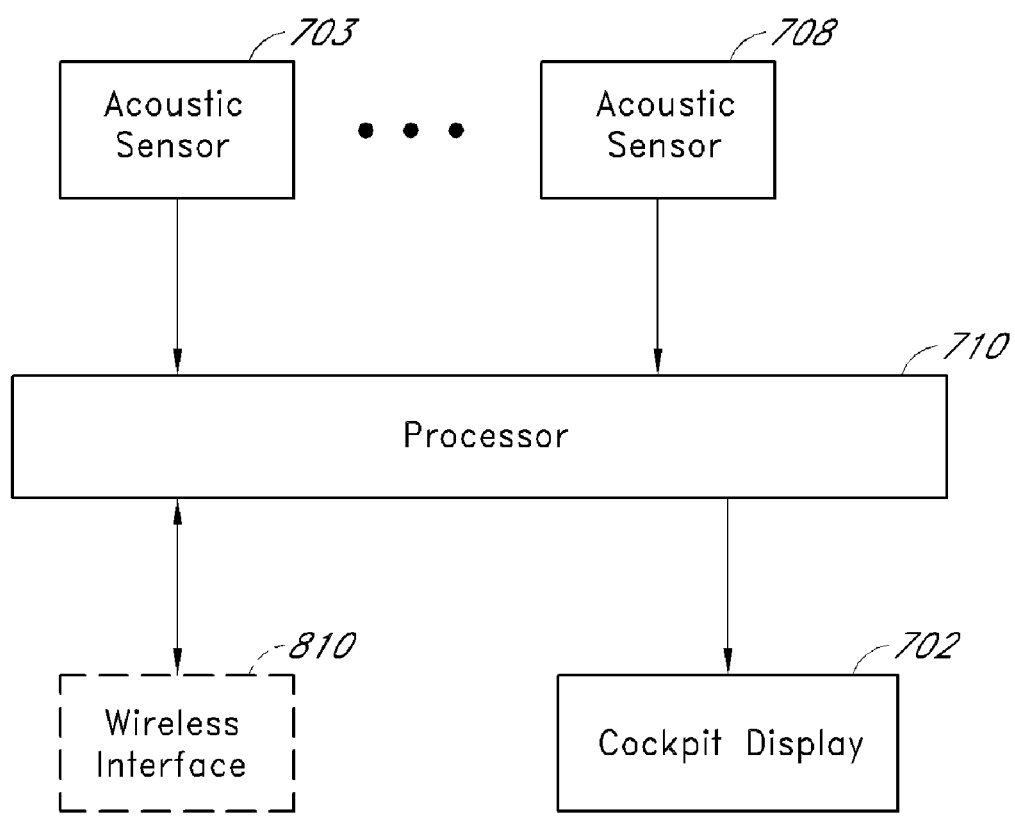
FIG. 8 is a block diagram showing the vehicle system of FIGS. 7A and 7B.

FIG. 8 is a block diagram showing the vehicle system of FIGS. 7A and 7B. The sensors 703-708 are provided to the processor 710. The processor 710 processes acoustic information received by the sensors 703-708 and provides commands to the cockpit display 702. In one embodiment, an optional wireless interface 810 is also provided to send information to the headset 160 and/or the communication module 102 to allow the headset 160 and/or communication module 102 to be used in connection with, or in lieu of, the cockpit display 702.

Although various embodiments have been described above, other embodiments will be within the skill of one of ordinary skill in the art. Thus, although described in terms of a deaf user, such description was for sake of convenience and not by way of limitation. The invention is limited only by the claims that follow.

What is claimed is:

1. An assistance system for deaf users, comprising:
a headset module; and
a communication module configured to communicate with said headset module using wireless two-way handshaking communication, said communication module configured to use data from one or more first microphones in said headset module to receive sounds in the vicinity of the deaf user and to provide classification of sounds, to provide warnings such that a deaf user is alerted to warning sounds in the vicinity of the deaf user, and to provide a display of speech to text such that speech from a person talking to the deaf user is translated into text for the deaf user.

2. The system of claim 1, said communication module further comprising an acoustic input device.

3. The system of claim 1, said communication module further comprising an acoustic output device.

4. The system of claim 1, said communication module further comprising a vibrator device.

5. The system of claim 1, said communication module further comprising a keypad input device.

6. The system of claim 1, said communication module further comprising an infrared receiver.

7. The system of claim 1, said communication module further comprising an infrared transmitter.

8. The system of claim 1, said communication module further comprising a GPS receiver.

9. The system of claim 1, said communication module further comprising an inertial motion unit.

10. The system of claim 1, said communication module further comprising a 2-axis inertial motion unit.

11. The system of claim 1, said communication module further comprising a 3-axis inertial motion unit.

12. The system of claim 1, said communication module further comprising an accelerometer.

13. The system of claim 1, said communication module further comprising an RF location system.

14. The system of claim 1, said communication module further comprising a second microphone configured to pick up speech by a user.

15. The system of claim 1, said management system further comprising a microphone configured to pick up ambient sounds in preference to user speech.

16. The system of claim 1, further comprising a video camera.

17. The system of claim 16, further comprising a facial recognition system.

18. The system of claim 1, said system further comprising a video monitor.

19. The system of claim 1, further comprising one or more repeaters.

20. The system of claim 1, further comprising one or more location system units disposed about an area.

21. The system of claim 20, wherein one or more of said location system units are configured to use infrared radiation for location and tracking of said communication module.

22. The system of claim 20, wherein one or more of said location system units are configured to use acoustic waves for location and tracking of said communication module.

23. The system of claim 20, wherein one or more of said location system units are configured to use electromagnetic waves for location and tracking of said communication module.

24. The system of claim 20, wherein one or more of said location system units further comprise motion detectors for a home security system.

25. The system of claim 1, wherein said communication device comprises a cellular telephone.

26. The system of claim 1, wherein said communication device comprises GPS receiver, said communication device configured to obtain location information from one or more location microphones.

27. The system of claim 1, wherein said communication device is configured to provide warning information to said user of sounds in other parts of a house.

28. The system of claim 1, wherein said communication device is configured to provide GPS waypoint information to said user.

29. The system of claim 1, wherein said communication device is configured to distinguish between speech and warning sounds.

* * * * *

UNITED STATES PATENT AND TRADEMARK OFFICE
CERTIFICATE OF CORRECTION

PATENT NO. : 7,356,473 B2 Page 1 of 1
APPLICATION NO. : 11/041166
DATED : April 8, 2008
INVENTOR(S) : Lawrence Kates It is certified that error appears in the above-identified patent and that said Letters Patent is hereby corrected as shown below:

On the Title Page, item (56) of the Patent at Column 2 (U.S. Patent Documents) at line 10, delete "2003/0233455" and insert --2003/0223455--.

Signed and Sealed this

Sixteenth Day of December, 2008

JON W. DUDAS
*Director of the United States Patent and Trademark Office*